(12) United States Patent
Rupprecht et al.

(10) Patent No.: US 11,645,234 B2
(45) Date of Patent: May 9, 2023

(54) RULE-BASED COLLECTIONS OF SUBSET(S) OF METADATA IN RESPONSE TO A TRIGGER EVENT OCCURRING

(71) Applicant: International Business Machines Corporation, Armonk, NY (US)

(72) Inventors: Lukas Rupprecht, San Jose, CA (US); Deepavali M. Bhagwat, Cupertino, CA (US); Constantine Arnold, San Jose, CA (US); Wayne A. Sawdon, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 390 days.

(21) Appl. No.: 16/387,390

(22) Filed: Apr. 17, 2019

(65) Prior Publication Data

US 2020/0334208 A1    Oct. 22, 2020

(51) Int. Cl.
*G06F 16/00*    (2019.01)
*G06F 16/17*    (2019.01)
(Continued)

(52) U.S. Cl.
CPC ........ *G06F 16/1734* (2019.01); *G06F 9/4887* (2013.01); *G06F 9/542* (2013.01); *G06F 16/907* (2019.01)

(58) Field of Classification Search
None
See application file for complete search history.

(56) References Cited

U.S. PATENT DOCUMENTS 3,600,998 A    8/1971    Palmer et al.
5,819,004 A  * 10/1998   Azadegan ............ H04N 19/159
                                                 375/E7.235
(Continued)

FOREIGN PATENT DOCUMENTS

| CN | 100416559 C | 9/2008 |
| EP | 1909220 A1 | 4/2008 |
| WO | 2005065166 A2 | 7/2005 |

OTHER PUBLICATIONS

Butleris et al., "Metadata for Business Rules Integration with Database Schema," IADIS, Virtual Multi Conference on Computer Science and Information Systems, 2005, pp. 263-270.
(Continued)

*Primary Examiner* — Hasanul Mobin
(74) *Attorney, Agent, or Firm* — Zilka-Kotab, P.C.

(57) ABSTRACT

A computer-implemented method according to one embodiment includes monitoring for occurrence of trigger events corresponding to creation of metadata in a computing environment, and detecting occurrence of a trigger event. The method further includes loading a rule that is associated with the detected trigger event in response to detecting occurrence of the trigger event. The rule includes a condition and an action, and the action defines a subset of metadata associated with processing a job in the computing environment. The method further includes collecting the defined subset of metadata in accordance with the action in response to the condition of the rule being met, and storing the collected subset of metadata. A system according to another embodiment includes a processor, and logic integrated with the processor, executable by the processor, or integrated with and executable by the processor. The logic is configured to perform the foregoing method.

20 Claims, 9 Drawing Sheets

(51) Int. Cl.
*G06F 9/54* (2006.01)
*G06F 9/48* (2006.01)
*G06F 16/907* (2019.01)

(56) References Cited

U.S. PATENT DOCUMENTS

| | | | | |
|---|---|---|---|---|
| 6,253,212 | B1* | 6/2001 | Loaiza | G06F 11/1402 |
| 7,958,106 | B2 | 6/2011 | Wilson, IV et al. | |
| 10,243,959 | B1* | 3/2019 | Balmakhtar | H04L 67/34 |
| 2005/0060281 | A1* | 3/2005 | Bucher | G06F 16/93 |
| 2006/0253320 | A1* | 11/2006 | Heywood | G06Q 30/02 |
| | | | | 705/14.18 |
| 2006/0253321 | A1* | 11/2006 | Heywood | G06Q 30/0224 |
| | | | | 705/14.18 |
| 2008/0114725 | A1* | 5/2008 | Indeck | G06F 16/22 |
| | | | | 707/999.102 |
| 2010/0198759 | A1* | 8/2010 | Haenel | G06F 9/5083 |
| | | | | 706/47 |
| 2011/0040666 | A1* | 2/2011 | Crabtree | G06Q 50/06 |
| | | | | 702/179 |
| 2012/0158966 | A1* | 6/2012 | Eberlein | H04L 41/085 |
| | | | | 709/226 |
| 2012/0233250 | A1* | 9/2012 | Man | G06F 16/38 |
| | | | | 709/204 |
| 2013/0190095 | A1* | 7/2013 | Gadher | A63F 13/77 |
| | | | | 463/1 |
| 2014/0074894 | A1 | 3/2014 | Han | |
| 2014/0195839 | A1* | 7/2014 | Chueh | G06F 1/3203 |
| | | | | 713/323 |
| 2015/0092564 | A1* | 4/2015 | Aldrin | H04L 43/55 |
| | | | | 370/241.1 |
| 2016/0261482 | A1 | 9/2016 | Mixer et al. | |
| 2016/0328470 | A1* | 11/2016 | Indeck | G06F 16/353 |

OTHER PUBLICATIONS

Drools, "Buisness Rules Management System," Red Hat, Inc., Retrieved on Apr. 17, 2019 from https://www.drools.org/, 3 pages.
Horrocks et al., "SWRL: A Semantic Web Rule Language Combining OWL and RuleML," W3C, May 21, 2004, Retrieved from https://www.w3.org/Submission/2004/SUBM-SWRL-20040521/, 24 pages.
RuleML, "The Rule Markup Initiative," RuleML, Dec. 8, 2013, Retrieved from http://ruleml.org/index.html, 12 pages.
GitHub, "j-easy/easy-rules: The simple, stupid rules engine for Java," GitHub, Inc , Retrieved on Apr. 17, 2019 from https://github.com/j-easy/easy-rules, 5 pages.
GitHub, "Rulebook," GitHub, Inc , Retrieved on Apr. 17, 2019 from https://github.com/rulebook-rules/rulebook, 16 pages.
Apache Kafka, "Getting the code," Apache Kafka, Retrieved on Apr. 17, 2019 from https://kafka.apache.org/code, 1 page.
Schiefer et al., "Event-Driven Rules for Sensing and Responding to Business Situations," DEBS '07, Jun. 2007, 9 pages.
Moshref et al., "Trumpet: Timely and Precise Triggers in Data Centers," SIGCOMM '16, Aug. 2016, 15 pages.
Cugola et al., "TESLA: A Formally Defined Event Specification Language," 4th ACM International Conference on Distributed Event-Based Systems (DEBS'10), Jul. 2010, 13 pages.
Muniswamy-Reddy et al., "Layering in Provenance Systems," ATC'09, Retrieved on Apr. 17, 2019 from https://www.usenix.org/legacy/event/usenix09/tech/full_papers/muniswamy-reddy/muniswamy-reddy.pdf, 14 pages.
Macko et al., "A General-Purpose Provenance Library," 4th USENIX Workshop on the Theory and Practice of Provenance (TaPP'12), Jun. 2012, pp. 1-6.
Ghoshal et al., "Provenance from Log Files: a BigData Problem," EDBT/ICDT '13, Mar. 2013, 8 pages.
Pasquier et al., "Camflow: Managed Data-Sharing for Cloud Services," IEEE Transactions on Cloud Computing, vol. 5, No. 3, Jul.-Sep. 2017, pp. 472-484.
Krishnamurthy et al., "On-the-Fly Sharing for Streamed Aggregation," SIGMOD 2006, Jun. 2006, pp. 623-634.
IBM, IBM Operational Decision Manager, IBM, retrieved on Apr. 19, 2019 from https://www.ibm.com/us-en/marketplace/operational-decision-manager, 7 pages.

* cited by examiner

780

782
path@ / gpfs / fs0 / lsf / . cwlexec / processesdb . mv . db ; event@CLOSE ; bytesWritten > 0 - >
DBTRANSFER select endtime , id , starttime , submittime , hpcjobid , parentid , name , owner , state from cwlstep / endtime
FROMDSN h2db TO admin : password@localhost : 5002 / workflowsteps
USING endtime , id , starttime , submittime , jobid , parentworkflowid , name , owner , state

784
path@ / gpfs / fs0 / lsf / . cwlexec / processesdb . mv . db ; event@CLOSE ; bytesWritten > 0 - >
DBTRANSFER select endtime , id , starttime , submittime , hpcjobid , name , owner , state , exitcode , descpath , inputspath from cwlworkflow / endtime
FROMDSN h2db
TO admin : password@localhost : 5002 / workflows
USING endtime , id , starttime , submittime , jobid , name , owner , state , exitcode , definition1 , definition2

786
path@ / gpfs / fs0 / lsf / work / testcluster / logdir / lsb . events ; event@WRITE - >
LOGLOAD path MATCH JOB_START_ACCEPT
FIELDS 2 , 3 , 4 , 5 DELIM
INTO admin : password@localhost : 5002 / scheduler
USING submittime , jobid , jobid , jobpgid

FIG. 7E

RULE-BASED COLLECTIONS OF SUBSET(S) OF METADATA IN RESPONSE TO A TRIGGER EVENT OCCURRING

BACKGROUND

The present invention relates to metadata management, and more specifically, this invention relates to rule-based collections of subset(s) of metadata in response to a trigger event occurring.

Metadata typically includes information about other data. Moreover, metadata may summarize information about data, e.g., which may be used for determining the location of the data. Metadata management in large-scale analytics environments is important for several purposes, e.g., bookkeeping, discovery, reproducibility, problem analysis, etc. For example, metadata is sometimes used to determine when/how an instance of data was previously created and/or determine the author of such data. According to some other examples, metadata is sometimes used to determine, e.g., input dependencies in terms of data and software/environment, an occurrence of errors, an amount of resources a job previously consumed, etc.

SUMMARY

A computer-implemented method according to one embodiment includes monitoring for occurrence of trigger events corresponding to creation of metadata in a computing environment, and detecting occurrence of a trigger event. The method further includes loading a rule that is associated with the detected trigger event in response to detecting occurrence of the trigger event. The rule includes a condition and an action, and the action defines a subset of metadata associated with processing a job in the computing environment. The method further includes collecting the defined subset of metadata in accordance with the action in response to the condition of the rule being met, and storing the collected subset of metadata.

A computer program product for trigger-based collection of a subset of metadata using conditions and actions of a rule associated with the trigger according to one embodiment includes a computer readable storage medium having program instructions embodied therewith. The program instructions are readable and/or executable by a computer to cause the computer to perform the foregoing method.

A system according to one embodiment includes a processor, and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 7E is a rule that includes a bundle of sub-rules, in accordance with one embodiment.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for trigger-based collection of a subset of metadata using conditions and actions of a rule associated with the trigger.

In one general embodiment, a computer-implemented method includes monitoring for occurrence of trigger events corresponding to creation of metadata in a computing environment, and detecting occurrence of a trigger event. The method further includes loading a rule that is associated with the detected trigger event in response to detecting occurrence of the trigger event. The rule includes a condition and an action, and the action defines a subset of metadata associated with processing a job in the computing environment. The method further includes collecting the defined subset of metadata in accordance with the action in response to the condition of the rule being met, and storing the collected subset of metadata.

In another general embodiment, a computer program product for trigger-based collection of a subset of metadata using conditions and actions of a rule associated with the trigger includes a computer readable storage medium having program instructions embodied therewith. The program instructions are readable and/or executable by a computer to cause the computer to perform the foregoing method.

In another general embodiment, a system includes a processor, and logic integrated with the processor, executable by the processor, or integrated with and executable by the processor. The logic is configured to perform the foregoing method.

Figure 1:
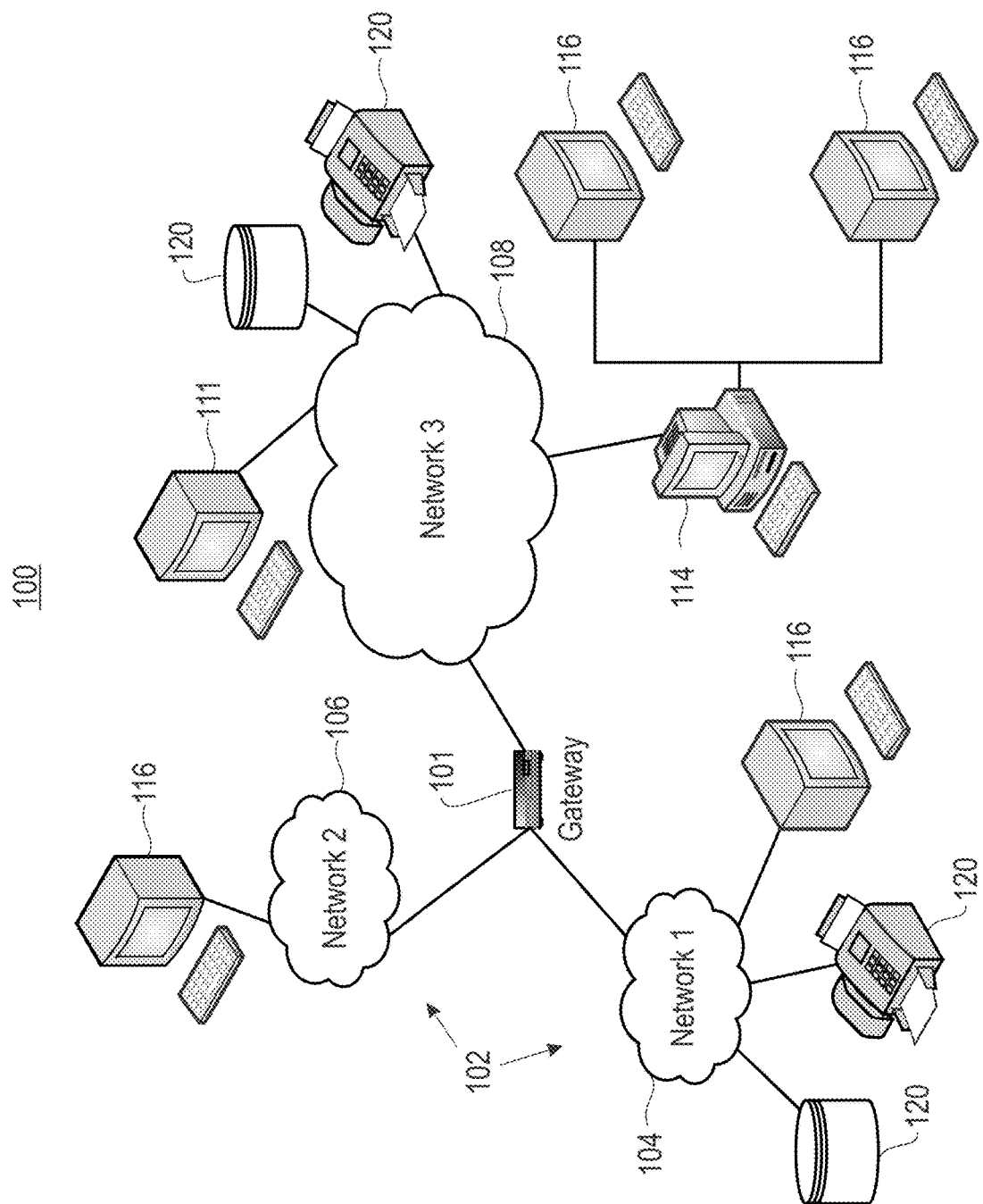
FIG. 1 is a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
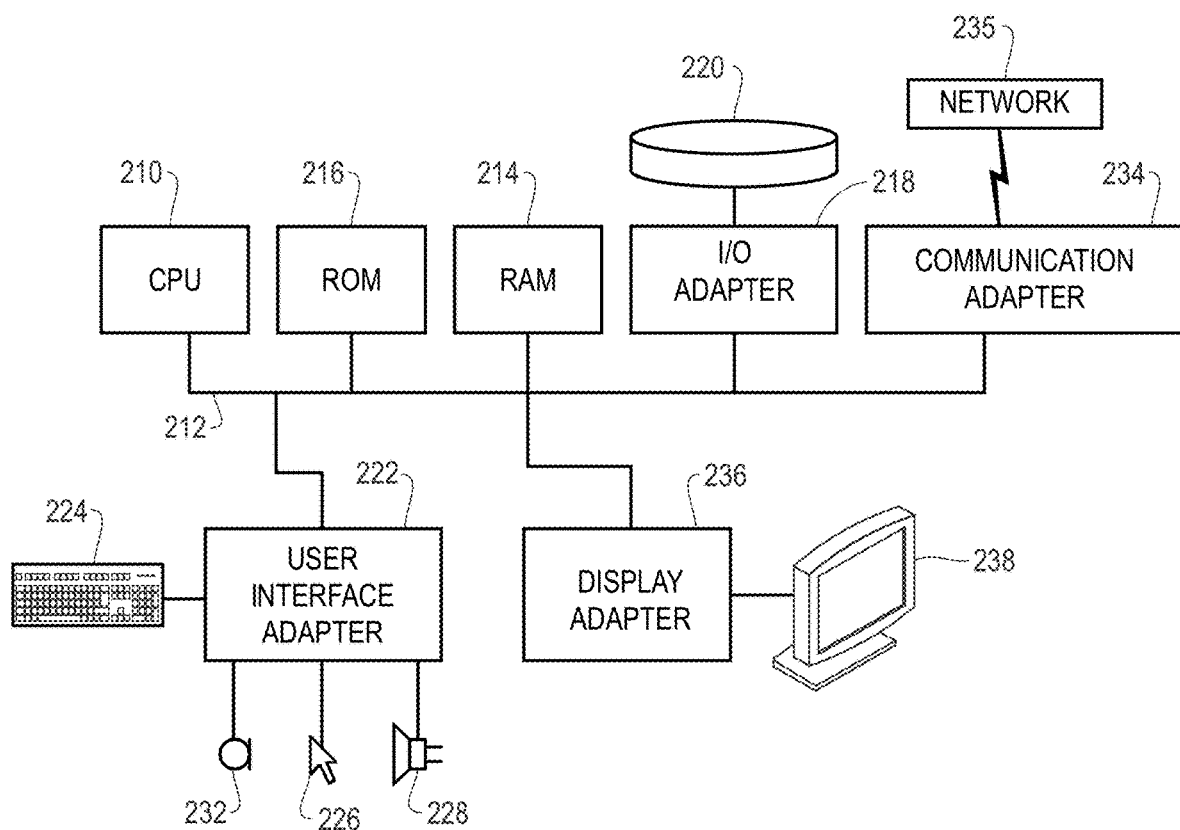
FIG. 2 is a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
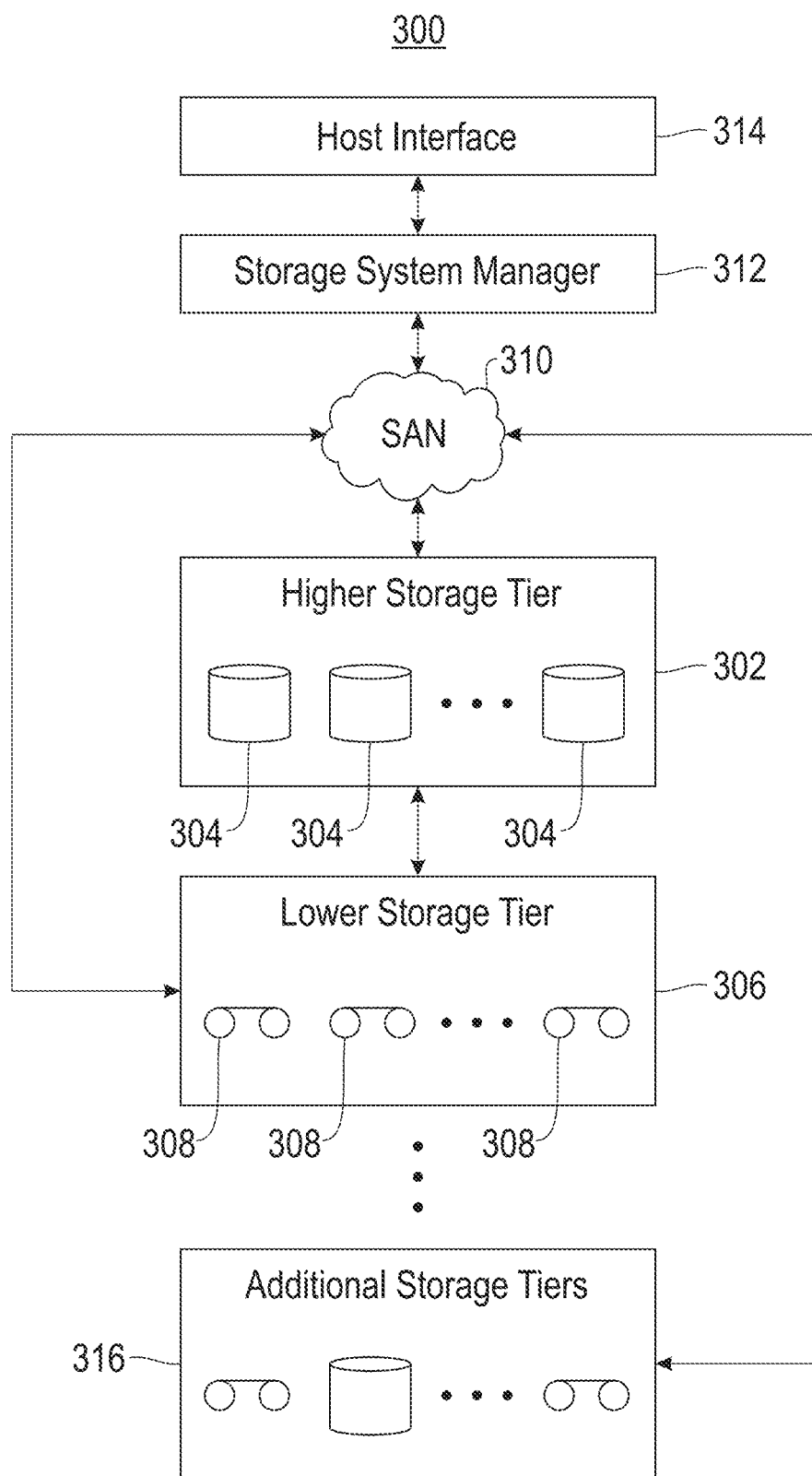
FIG. 3 is a tiered data storage system in accordance with one embodiment.
Figure 4:
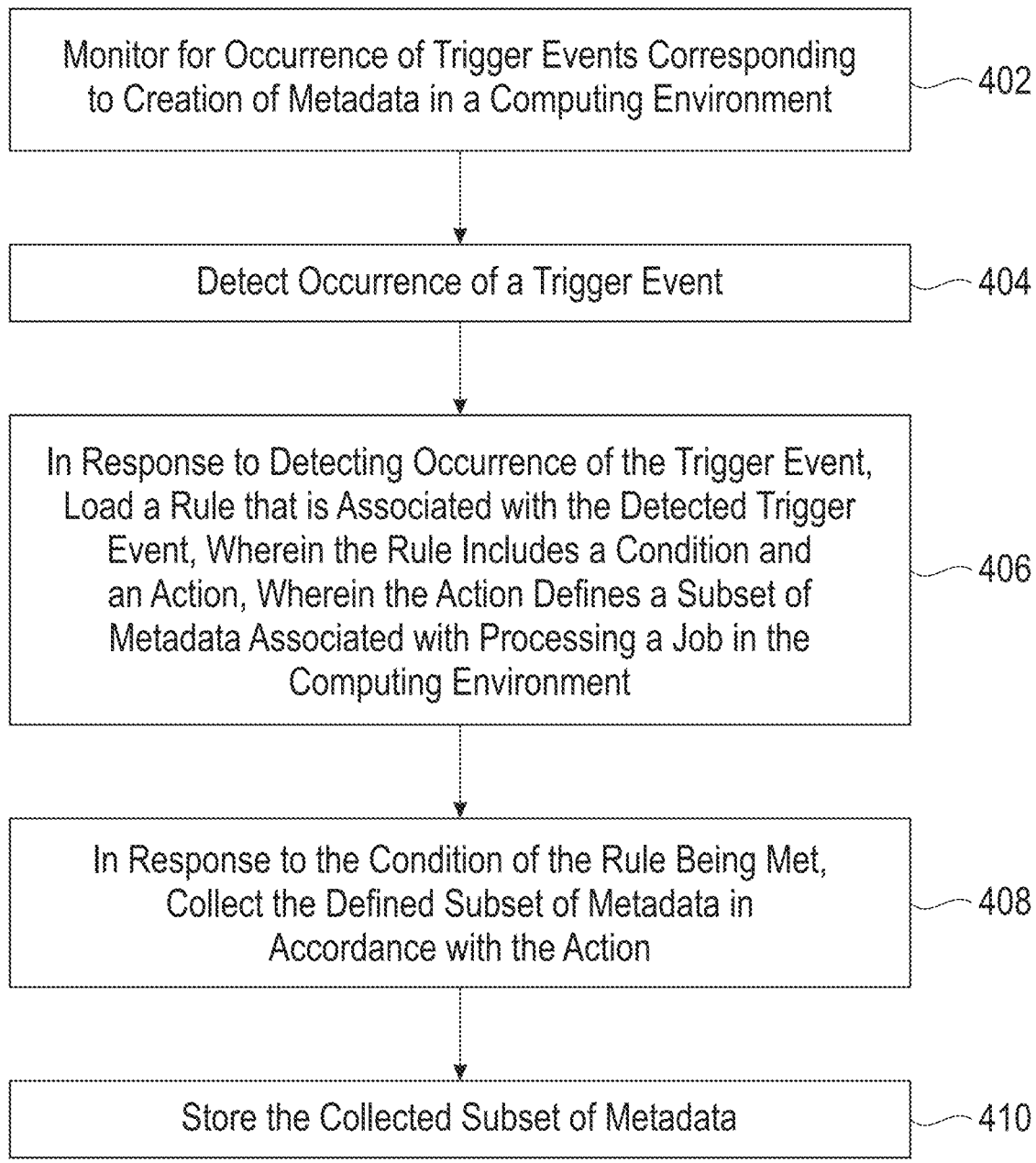
FIG. 4 is a flowchart of a method, in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

As mentioned elsewhere above, metadata typically includes information about other data. Moreover, metadata may summarize information about data, e.g., which may be used for determining the location of the data. Metadata management in large-scale analytics environments is important for several purposes, e.g., bookkeeping, discovery, reproducibility, problem analysis, etc. For example, metadata is sometimes used to determine when/how an instance of data was previously created and/or determine the author of such data. According to some other examples, metadata is sometimes used to determine, e.g., input dependencies in terms of data and software/environment, the cause of errors, an amount of resources a job previously consumed, etc. In relatively larger scale jobs, metadata may include input parameters of a particular job, which may also be determined from associated stored metadata.

"Rich" domain-specific metadata is used for improving result analysis. To clarify, "rich" domain-specific metadata (hereafter "rich domain-specific metadata") may be relatively detailed metadata, e.g., includes relatively more detailed metadata that is otherwise generated/stored for an average computing function. Rich domain-specific metadata may be used for determining, e.g., the intermediate data produced by a job, the input parameters of a specific task, etc. However, such metadata may originate from several sources and/or include various formats, e.g., system internal databases, logs, kernel data structures, structured/unstructured data files, etc. Because rich metadata includes several different formats, it can be relatively difficult to collect the metadata using a unified process.

Some conventional techniques for collecting metadata are prone to data inaccuracies. For example, some conventional techniques for collecting metadata include collecting ephemeral metadata, however, such metadata is often lost if not collected in a timely manner. In another example, domain knowledge is sometimes required to identify correct metadata sources in some conventional techniques. This sometimes results in data being missed if all sources (or at least some sources used for a particular collection of metadata) are not specified.

Moreover, there are relatively high costs associated with some conventional techniques utilized for collecting metadata due to such collection being environment-specific.

In sharp contrast, various embodiments and/or approaches described herein include using rule-based collections of subset(s) of metadata in response to a trigger event occurring. Specifically, such subset(s) of metadata are defined by an action included in the rule, and may be collected in accordance with the action in response to a condition of the rule being met.

Operation 402 of method 400 includes monitoring for occurrence of trigger events corresponding to creation of metadata in a computing environment. The metadata may include any known type of metadata, e.g., originating from any one or more sources. For example, in one approach, the metadata may include intermediate data. The metadata may additionally and/or alternatively include environment data. In yet another approach, the metadata may additionally and/or alternatively include telemetry.

The creation of metadata in the computing environment may occur in the process of processing a job. For example, a job may be received, e.g., from a user, for performing in the computing environment. The job may be distributed, e.g., by a master node, to one or more worker nodes for processing the job. During processing of the job, metadata may be created. An example of such a process will be described elsewhere herein, e.g., see FIG. 5.

According to some approaches, the trigger event(s) may occur as a result of worker nodes of the computing environment processing the job and thereby creating metadata in the computing environment. Accordingly, in some approaches, triggers may be events generated by a metadata source in order to signal that new metadata has become available/is available. According to some more specific approaches, during processing of a job, trigger event(s) may occur as a result of one or more of the worker nodes, e.g., interacting with the computing environment, interacting with a storage system that is in communication with and/or known to the computing environment, processing data, generating and/or modifying data, adding a new entry to a scheduler database, appending a new log message to a job log, etc.

In other approaches, the trigger event(s) may additionally and/or alternatively occur periodically, e.g., upon a predetermined amount of time elapsing. For example, the trigger event(s) may occur, e.g., every second, every hour, once every twenty-four hours, etc.

The trigger events may be any type of event. For example, in one general approach, the trigger event may be based on a storage system producing something. According to some more specific approaches, the trigger event may be, e.g., a new entry being added to a scheduler, a new log message being appended to a job log associated with the job, a file system and/or a file therein being opened, a file system and/or a file therein being closed, a file of a file system being renamed, etc. According to some other specific approaches, the trigger event may additionally and/or alternatively be, e.g., a file system being written to, a file system being read and/or written from, a put and/or get function being performed, a migrating of a file of a file system an archiving of a file of a file system, a replicating of data. For purposes of a further example, referring momentarily back to FIG. 3, in one approach the trigger event may additionally and/or alternatively be a migrating of a file in a storage system, e.g., migrating the contents and pointer of a file stored in storage media 308 of the lower storage tier(s) 306 to a storage media 304 of the higher storage tier(s) 302.

With continued reference to method 400, according to various approaches, monitoring for the occurrence of trigger events may be performed using any one or more known techniques for monitoring for an event. For example, in one approach, monitoring for the occurrence of trigger events may include comparing, e.g., detected events (using a known type of comparator) with a predetermined list of trigger events. In another approach, monitoring for the occurrence of trigger events may additionally and/or alternatively include evaluating, e.g., using a rule engine handler, detected events to determine if any of one or more known rules are pre-associated with the detected event. More specifically, in such an approach, the monitoring may include waiting for and evaluating the output of event sources, e.g., see FIG. 6. Some non-limiting examples of event sources may include, e.g., worker nodes, a master node, an accessor, a writer, etc.

Operation 404 of method 400 includes detecting occurrence of a trigger event. It should be noted that for simplification purposes, various approaches of method 400 are described below with respect to collecting metadata based on detecting occurrence of a single trigger event in the computing environment. However, according to another approach, method 400 may be performed with respect to the detected occurrence of a plurality of trigger events in a computing environment. In such an approach, method 400 may include performing one or more operations in parallel in the computing environment. According to another approach, method 400 may be performed with respect to the detected occurrence of a plurality of trigger events in a plurality of different computing environments. In such an approach, method 400 may include performing one or more operations in parallel in the plurality of computing environments.

In response to detecting occurrence of the trigger event, a rule that is associated with the detected trigger event may be loaded, e.g., see operation 406. According to some preferred approaches, the rule includes a condition and an action. The action may in some approaches define a subset of metadata associated with processing a job in the computing environment. In some approaches, the defined subset of metadata includes a portion of metadata that is associated with processing the job in the computing environment. For example, according to one specific approach, the action of the rule may define the subset of metadata to be bytes of data that have been written to a specified file. In another approach, the defined set of metadata may include all metadata that is associated with processing the job in the computing environment. Moreover, the action may include any known type of action as will be described in greater detail elsewhere below.

The defined subset of metadata being associated with the processing of the job may narrow/refine the amount of metadata that might otherwise be processed and/or stored using a conventional global metadata collection technique. However, despite potentially collecting such a narrowed/refined amount of metadata, the subset of metadata defined by the action includes an amount of information that can be thereafter accessed for detailing/describing data associated with the subset of metadata.

According to various approaches, the condition of the rule may be used to specify when the subset of metadata defined by the action is collected, e.g., in response to the condition being met, in response to the condition being true, in response to the condition not being met, etc. The condition of the rule may include any type of condition. For example, in some approaches, the condition may include a matching condition, e.g., that a regex matches a file path. In some other approaches, the condition may include an arithmetic comparison, e.g., a number of bytes written to a file within a predetermined amount of time is greater than a value of zero, a number of bytes written to a file since a most recent collection of metadata from the file is greater than a value of zero, a number of bytes that a file contains is greater than a predetermined number of bytes, etc.

Operation 408 of method 400 includes collecting the defined subset of metadata in accordance with the action. In some preferred approaches, collecting the defined subset of metadata in accordance with the action may be performed in response to the condition of the rule being met.

One or more actions of the rule may be performed during collecting the defined subset of metadata in accordance with the action. As previously mentioned elsewhere above, such action(s) may include any known type of actions. For example, in one approach, the action of the rule may include indexing structured data, e.g. DBLOAD. In another approach, the action of the rule may include indexing unstructured data, e.g., DBLOAD. In another approach, the action of the rule may include indexing log data, e.g., LOGLOAD. In some other approaches, the action of the rule may include, e.g., indexing data from a database (DBTRANSFER), a user defined arbitrary action (EXEC), loading telemetry (STATS LOAD), etc. In another approach, the action of the rule may include a command-line action (EXEC). Such an action may allow a user to specify arbitrary actions to be performed in response to condition(s) of the rule being met/matching.

It should be noted that actions may in some approaches be evaluated using the same data during the processing of the job in the computing environment, e.g., a log file that is to be loaded, a system-specific database, etc. In some approaches, actions may keep track of an associated most previously loaded item in order to avoid duplicates. For example, assume that a rule specifies to extract data from "logfile A" every time a write is performed on logfile A. Upon each performed extraction of data from logfile A, an action of the rule may include storing the offset of logfile A, e.g., a location at which reading stopped at the end of a most recently performed read operation. As a result of storing the offset of logfile A, upon thereafter extracting data from logfile A, a rereading of the entire logfile A is avoided, and instead a read of logfile A may begin from the most recently stored offset. This also avoids items being loaded several times unnecessarily, as would otherwise occur in starting reading from a beginning of the logfile A. These benefits are useful for performance of a system as processing potential is preserved, and for ensuring efficient read times.

In some approaches, the action of the rule may be stateful. In other words, the action of the rule may occur in the form of a predefined stateful action occurring. For example, a state of the stateful action may include a byte offset of a log file that is parsed during the processing of the job, e.g., LOGLOAD. In such an approach, upon each detected occurrence of a trigger event in the computing environment, the action may be evaluated from the byte offset on. Moreover, the state may additionally contain an inode of the log file in order to detect rollover.

According to another example, a state of the stateful action may include a byte offset on a metadata file, e.g., DBLOAD.

According to yet another example, a state of the stateful action may include a predefined attribute, e.g., predefined by a user, in a database of a system within the computing environment from which metadata is to be loaded, e.g., via DBTRANSFER. In such an example, the database may be a system-specific database within the computing environment. In such an approach, the attribute is preferably monotonically increasing and unique, e.g., an autoincremented ID, a job submission date, etc.

The collected subset of metadata may be stored, e.g., see operation 410 of method 400. According to various approaches, the subset of metadata may be stored to any one or more locations, e.g., to a local database, to a database of cloud-based storage, to a list, in a table, etc.

In some approaches, method 400 may optionally include indexing and/or querying the collected subset of metadata.

Figure 7A:
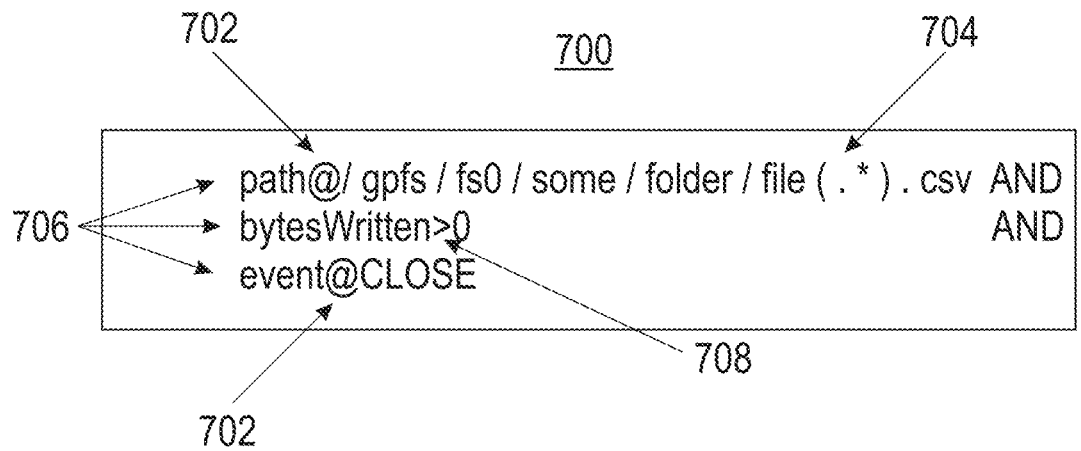
FIG. 7A is a rule that is associated with a trigger event, in accordance with one embodiment.

It should be noted that although several of the approaches above describe the loaded rule to include a single action and/or a single condition, in some approaches a rule may include subclauses, e.g., more than one action and/or condition, which may be combined using logical connectors, e.g., AND, OR, NAND, NOR, etc., e.g., see FIG. 7A. Moreover, although several of the approaches above describe the loaded rule to include a single action and/or a single condition, in some approaches, loading the rule may include loading a bundle of sub-rules that are pre-associated with the detected trigger event, e.g., see FIG. 7E. With continued reference to method 400, each of the sub-rules may include at least one respective condition and at least one respective action. Accordingly, in some approaches, the actions of the bundle of sub-rules may define more than one subset of metadata. Various examples of such actions and conditions of rule(s) will be described elsewhere herein, e.g., see FIGS. 7A-7E.

In some approaches in which the rule includes a bundle of sub-rules that are pre-associated with the detected trigger event, the subset(s) of metadata defined by actions of the bundle of sub-rules may be collected in accordance with more than one action of the sub-rules of the bundle of sub-rules.

The rule-based collection of a subset of metadata described in various embodiments and approaches herein is useful for several reasons. Specifically, as will now be described, as a result of the defining of the subset of metadata, the deficiencies of conventional metadata gathering practices described elsewhere above are avoided/mitigated. For example, as a result of defining and collecting the subset of metadata using conditions and actions of the rule, data is not lost as a result of otherwise being collected in a time-consuming manner. Instead, the subset(s) of metadata, and particularly ephemeral metadata of the subset(s) of metadata are defined by the action(s) of the rule and collected in response to the condition of the rule being met. Moreover, the collected subset(s) of metadata is not complicated for users because the rules described herein describe metadata collection in a high-level language such that a user using the rules need not understand the capture details. As previously mentioned elsewhere herein, this benefit is not available in conventional metadata collection techniques, due to such collection including a variety of different formats.

In another example, as a result of an action of a rule defining a subset of metadata for collecting, data is not missed being collected during processing of a job. This data might otherwise be missed as a result of domain knowledge and/or data sources being unspecified. In sharp contrast, some embodiments and approaches described herein, e.g., such as method 400, define a rule having a bundle of sub-rules for different environments, e.g., an operating system, a scheduler, a processing engine, etc., by which a defined subset of metadata is to be collected.

Yet another beneficial result of an action of a rule defining a subset of metadata for collecting includes relatively lower porting costs than otherwise exists in conventional environment-specific metadata collection. This is at least in part because several embodiments and/or approaches described herein allow for the port/reuse of existing rules across different environments, e.g., using a bundle of sub-rules of a loaded rule. Moreover, the subset of metadata collected is generic and thereby can be used in an environment thereafter.

Figure 5:
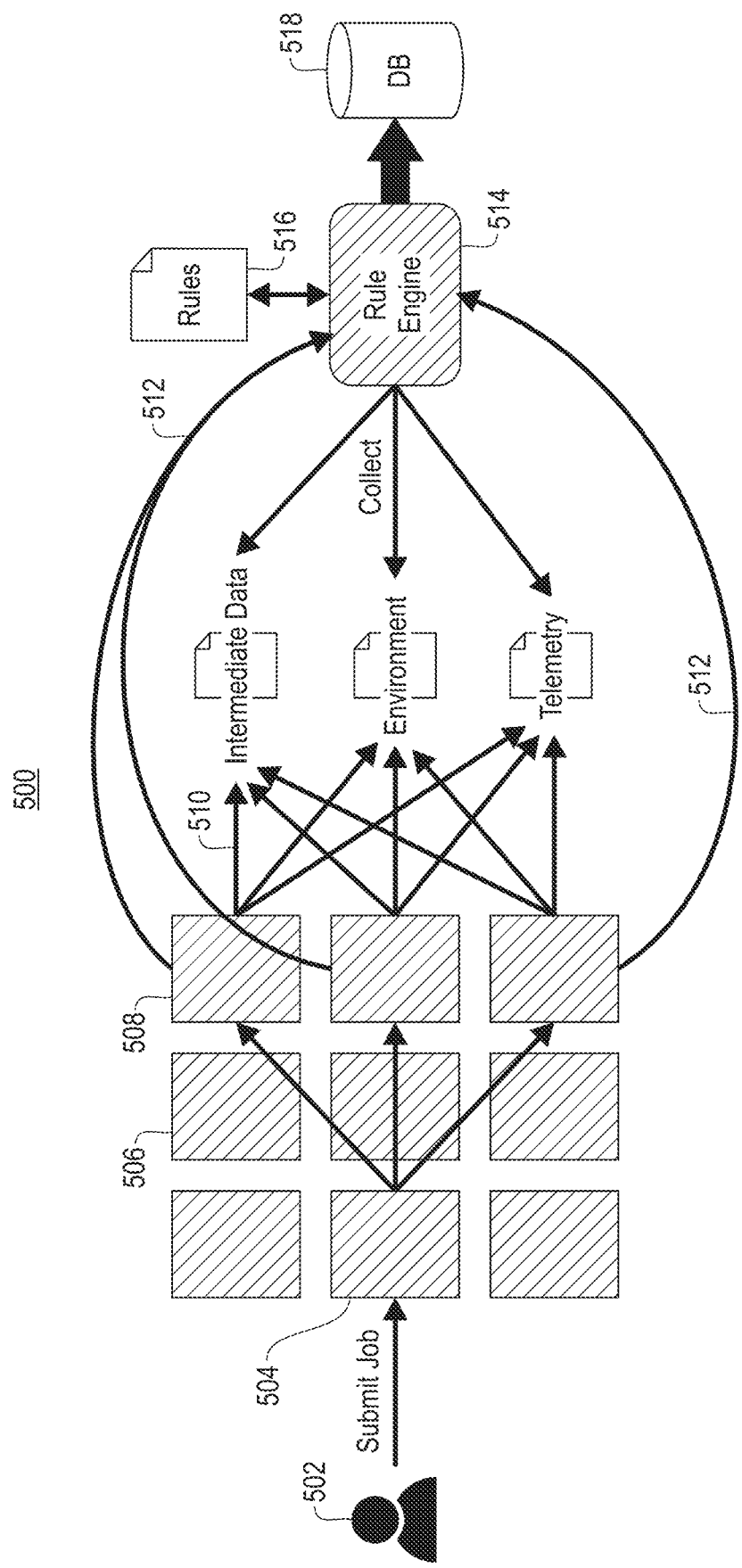
FIG. 5 is an architecture in which subsets of metadata are collected, in accordance with one embodiment.

FIG. 5 depicts an architecture 500 for collecting metadata during processing of a job, in accordance with one embodiment. As an option, the present architecture 500 may be implemented in conjunction with features from any other embodiment listed herein, such as those described with reference to the other FIGS. Of course, however, such architecture 500 and others presented herein may be used in various applications and/or in permutations which may or may not be specifically described in the illustrative embodiments listed herein. Further, the architecture 500 presented herein may be used in any desired environment.

Architecture 500 includes a user 502 that submits a job to a master node 504 of a computing environment 506. The job may be distributed, e.g., by the master node 504, to one or more worker nodes 508 for processing the job. During processing of the job, metadata 510 may be created. Specifically, in the architecture 500, the created metadata 510 at least includes intermediate data, environment data and telemetry data.

Trigger events 512 corresponding to the creation of the metadata 510 in the computing environment 506 may occur. Accordingly, similar to as described in operation 402 of method 400, the occurrence of trigger events 512 in architecture 500 may be monitored for, e.g., using a rule engine 514. In response to detecting occurrence of a trigger event 512, a rule 516 that is associated with the detected trigger event 512 may be loaded, e.g., loaded in the rule engine 514. In some preferred approaches, the rule 516 includes a condition and an action. The action may define a subset of metadata associated with processing the job in the computing environment 506.

The defined subset of metadata may be collected in accordance with the action in response to the condition of the rule being met. Subsequently, the collected metadata may be stored and/or indexed to any one or more locations. For example, as shown in FIG. 5, the collected subset of metadata may be stored and/or indexed to a database 518. Note that in response to the condition not being met, the subset of metadata may not be collected. Moreover, a notification may be generated and output that details, e.g., that new available metadata was not collected, information detailing why the metadata was not collected, etc.

Figure 6:
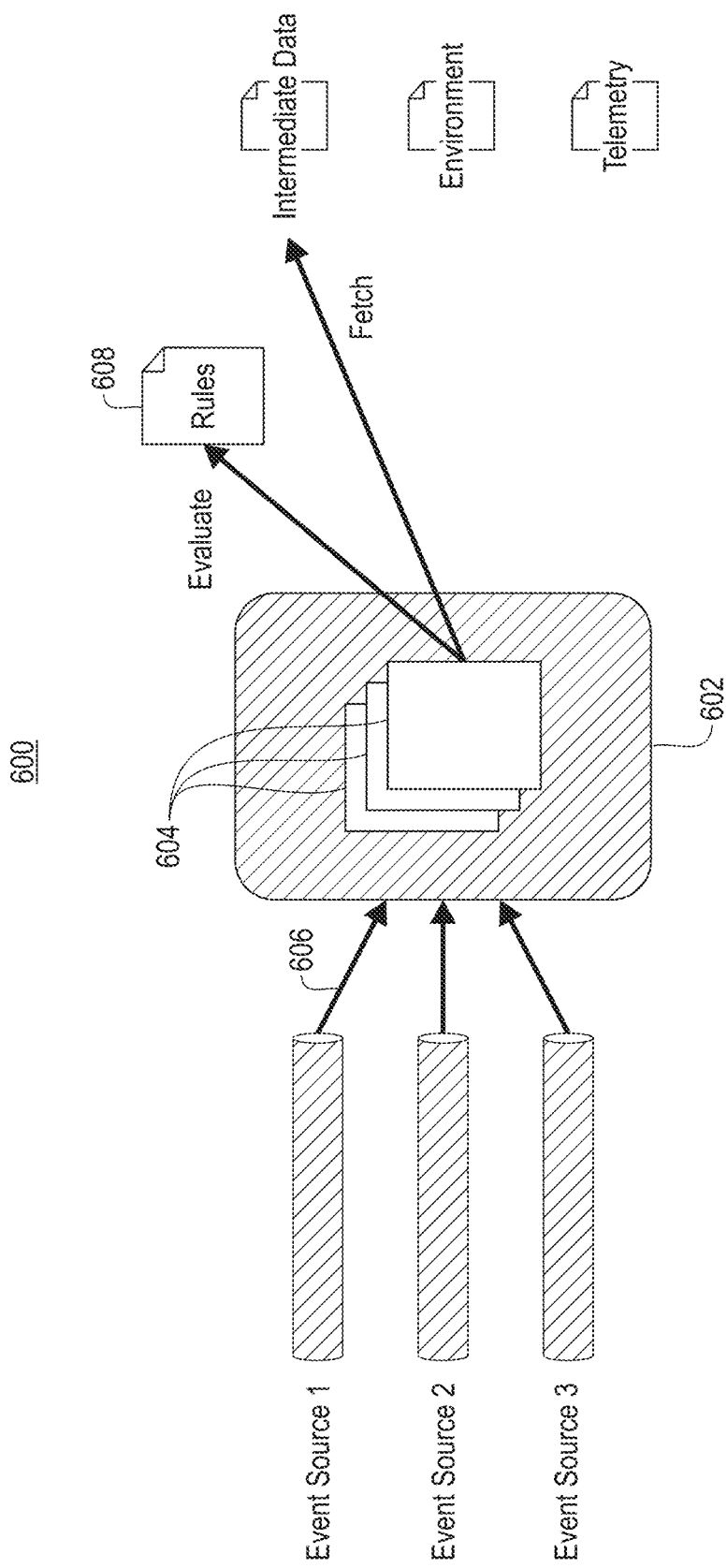
FIG. 6 is a representation of using a rule engine handler to evaluate whether rules are associated with the detected occurrence of trigger events.

FIG. 6 depicts a representation 600 of using a rule engine handler to evaluate whether rules are associated with the detected occurrence of trigger events, in accordance with one embodiment. As an option, the present representation 600 may be implemented in conjunction with features from any other embodiment listed herein, such as those described with reference to the other FIGS. Of course, however, such representation 600 and others presented herein may be used in various applications and/or in permutations which may or may not be specifically described in the illustrative embodiments listed herein. Further, the representation 600 presented herein may be used in any desired environment.

Representation 600 includes three event sources, e.g., event sources 1-3, which may be monitored by a rule engine 602. As illustrated in representation 600, the rule engine 602 may include a plurality of rule engine handlers 604, each of which may be associated with a respective one of the event sources 1-3. Moreover, each of the rule engine handlers 604 may monitor for an occurrence of trigger events 606 originating from a different one of the event sources 1-3. Any of the event sources 1-3 may be at least a portion of a computing environment. According to various approaches, the rule engine handlers may receive events from any one or more sources, e.g., a known distributed streaming platform (such as ApacheKafka® which may be downloaded at https://kafka.apache.org/code), a known type of daemon for auditing (such as auditd), a known type of daemon for executing scheduled commands (such as crond), etc.

In response to detecting occurrence of a trigger event, a rule that is associated with the detected trigger event may be loaded. In some preferred approaches, the rule includes a condition and an action. The action may define a subset of metadata associated with processing a job in the computing environment. For example, in one approach, metadata associated with processing the job in the computing environment may be evaluated, e.g., see evaluated of FIG. 6, using the loaded rule. Based on such an evaluation being performed, the subset of metadata associated with processing a job in the computing environment may be defined. Thereafter the action of the rule may be performed on the defined subset of metadata, e.g., intermediate data, environment, telemetry, etc., in response to the condition of the rule being met. For example, in the current approach, the defined subset of metadata is collected in accordance with the action of the rule, e.g., see fetch of FIG. 6.

Figure 7B:
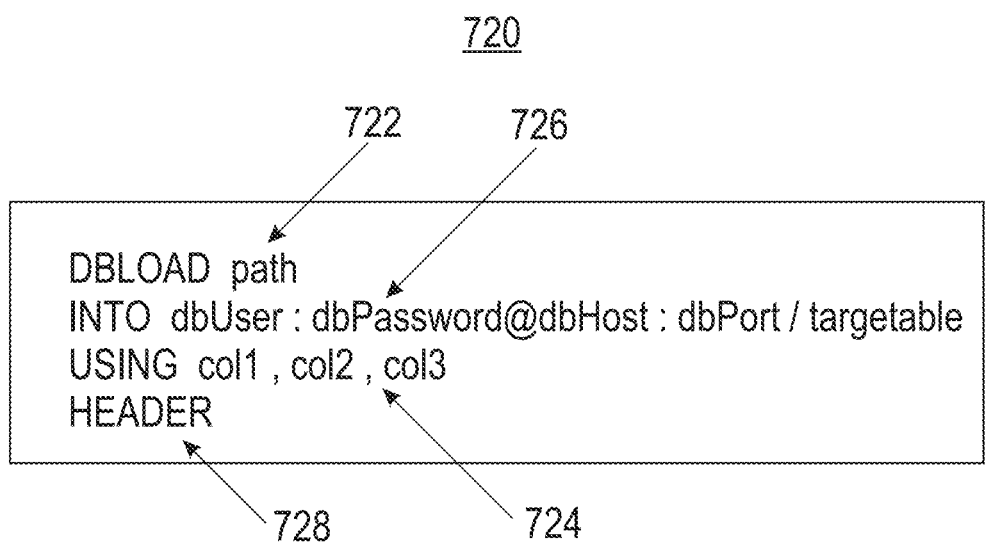
FIGS. 7B-7D are actions of rules, in accordance with several embodiments.
Figure 7C:
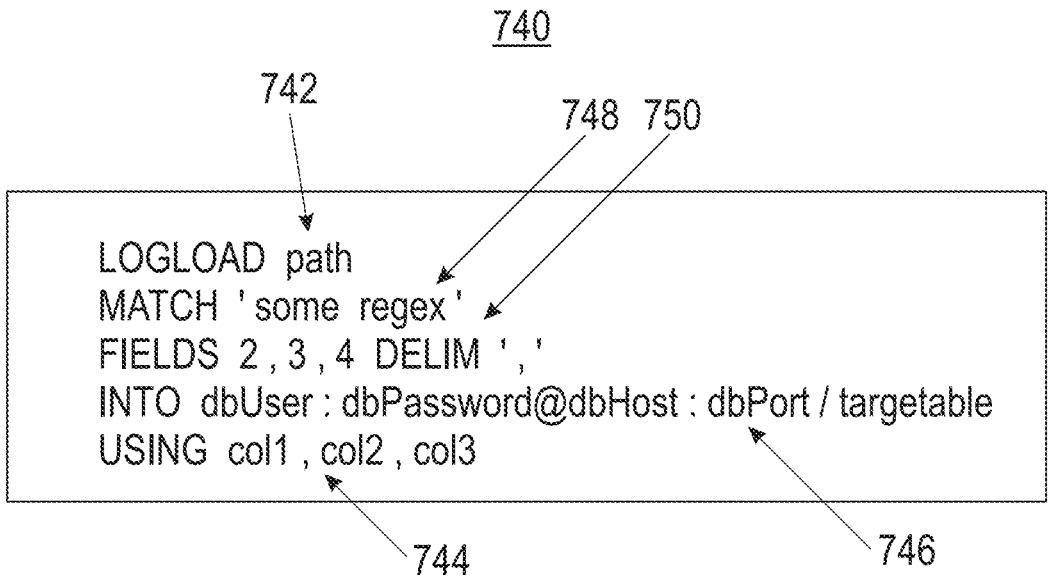
Figure 7D:
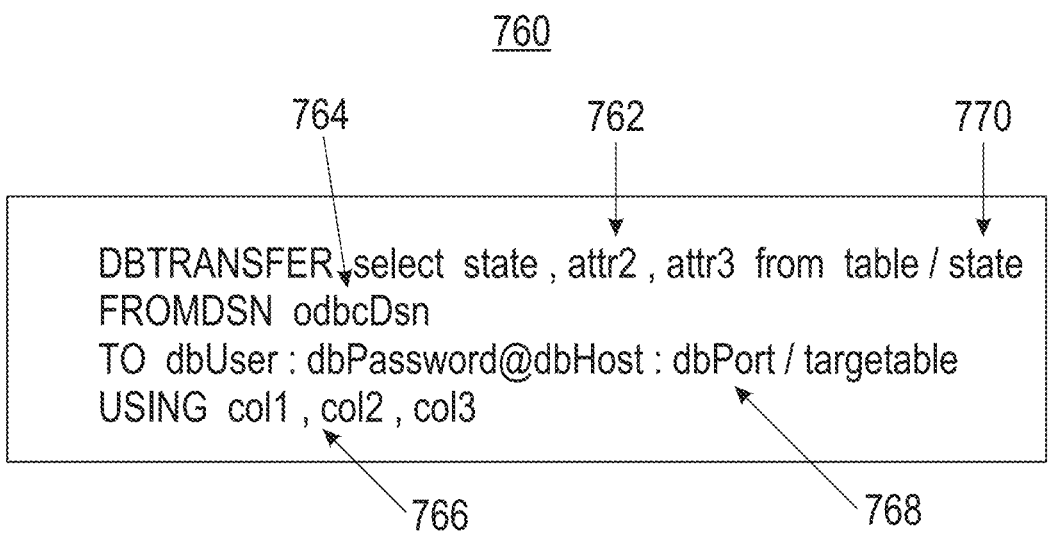

FIGS. 7A, 7E depict rules 700, 780 and FIGS. 7B-7D depict actions 720, 740, 760, in accordance with several embodiments. As an option, the present rules 700, 780 and actions 720, 740, 760 may be implemented in conjunction with features from any other embodiment listed herein, such as those described with reference to the other FIGS. Of course, however, such rules 700, 780 and actions 720, 740, 760 and others presented herein may be used in various applications and/or in permutations which may or may not be specifically described in the illustrative embodiments listed herein. Further, the rules 700, 780 and actions 720, 740, 760 presented herein may be used in any desired environment.

FIG. 7A includes the rule 700 that is associated with a trigger event in accordance with one embodiment. The rule 700 may be associated with a trigger event and may be loaded in response to detecting occurrence of the trigger event. Moreover, the rule 700 includes several event fields 706, which in the present approach specify a plurality of conditions, e.g., subclauses. More specifically, in the present approach the rule 700 includes subclauses of conditions which are combined using logical connectors, e.g., see AND.

A first condition of the rule 700 (first line of the rule 700) includes a regex 702 matching a file path 704, e.g., file path: /gpfs/fsΘ/some/folder/file(.*).csv. A second condition of the rule 700 (third line of the rule 700) includes a regex matching the specified file path 704 being closed, e.g., see CLOSE. Moreover, a third condition of the rule 700 (second line of the rule 700) includes an arithmetic comparison 708. Specifically, in the present approach, the arithmetic comparison 708 condition specifies that a number of bytes written to the specified file path 704 prior to the file path 704 closing is greater than zero.

In some approaches, in response to the conditions of the rule 700 being met, the action associated with the rule may be performed. Various examples of such actions are described elsewhere below, e.g., see actions 720, 740, 760 of FIGS. 7B-7D.

Referring now to FIG. 7B, action 720 is an action that may be used for indexing structured and/or unstructured data into a database. As mentioned elsewhere herein, in some approaches an action may define a subset of metadata associated with processing a job in a computing environment. For example, in the present approach, action 720 includes an event attribute 722 which contains path information of a metadata file, i.e., path. The metadata file specified by the action 720 may be loaded, e.g., see the specified action DBLOAD, into locations also specified by the action 720. For example, the action 720 specifies that the metadata file be loaded into a target schema 724 of a target database dbUser. More specifically, in the present approach the metadata file is specified to be loaded into locations, e.g., such as columns col1, col2, col3 of a table, of the target database dbUser, e.g., using database connecting string 726. The action 720 also includes a header indicator 728, which indicates whether or not the metadata file being loaded into the locations of the target database includes a header or not.

For context, according to various approaches, the action 720 may be used for capturing metadata that matches conditions of a rule that includes the action 720. In one specific approach, such metadata may include intermediate metadata that is scheduled to be deleted. As a result of capturing the intermediate metadata before it is deleted, the metadata may be queried and thereafter accessible/known. In another specific approach, such metadata may include process identifiers (PIDs) that correspond to a job identity (ID) specified in the rule, e.g., such where a job has been performed but information of the performed job has not yet been recorded in a database. In such an approach the action 720 may be at least in part used for locating and/or indexing information of a data entry associated with the job ID to a database specified by the action 720.

The action 740 of FIG. 7C is an action that may be used for indexing log data into a database. In the present approach, action 740 includes an event attribute 742 which contains path information of a log file, i.e., path. The log file specified by the action 740 may be loaded, e.g., see the specified action LOGLOAD, into locations also specified by the action 740. For example, the action 740 specifies that the metadata file be loaded into a target schema 744 of a target database dbUser. More specifically, in the present approach the metadata file is specified to be loaded into locations, e.g., such as columns col1, col2, col3 of a table, of the target database dbUser, e.g., using database connecting string 746.

The action 740 also includes a matching clause MATCH in the present approach, which specifies (using a regex) log lines of interest, e.g., log lines that are to be collected from a log file for storing in a database. In some approaches, only a portion of such log lines are collected. For example, the action 740 may include log line parsing instructions 750, which may specify portions of the log line(s) that are to be collected for storing.

Referring now to FIG. 7D, the action 760 is a database transfer (DBTRANSFER) action that may be used to index data from a database to metadata storage. In one approach, database transfer actions may be used for transferring data from a database that stores historic workflow information to metadata storage. According to another approach, database transfer actions may be used for transferring data from anything that uses open database connectivity (ODBC) to metadata storage. In some approaches, a database transfer action may be similar to a LOGLOAD action, e.g., see action 740 of FIG. 7C, however, database transfer actions may be configured to be used for application specific databases rather than log files.

The action 760 includes a specified query 762 that is to be used upon collecting/extracting a subset of application database metadata defined by the action 760 of a rule. The action 760 also includes a data source name (DSN) 764 for the ODBC connection. Moreover, the action 760 specifies that the metadata collected from the database be transferred into a target schema 766 of a target database dbUser. Although an ODBC connection is used in the present approach for connecting to the database from which metadata is collected/transferred, a connecting string 768 may be additionally and/or alternatively used in some approaches.

As previously mentioned elsewhere herein, in some approaches, an action of a rule may be stateful. Implementation of stateful actions in the rule-based collection of metadata described herein may beneficially result in a more refined amount/relevant subset of metadata being collected than is otherwise collected using global metadata collection. In some approaches this beneficial degree of collection results from the stateful action defining only subset(s) of metadata that pertain to portions of a file that have been updated but not yet recoded in metadata collection. Moreover, the stateful action in such approaches does not define subset(s) of metadata that pertain to portions of the file that have not been updated, which would otherwise incorporate non-relevant subsets of metadata into the defined/collected subset of metadata.

Implementation of stateful actions may additionally and/or alternatively result in relatively less time-consuming collection of metadata. For example, referring again to action 740 of FIG. 7C, during parsing of relevant data in a log file, parsing the log file from a beginning of the file may be relatively more time-consuming than otherwise using a state of the action. This is because parsing the log file from a beginning of the file in order to index log data into a target database likely includes rescanning all data of the log file and thereby loading metadata into the target database more than once. In sharp contrast, as a result of utilizing a stateful action in a rule, e.g., such in the action 740, a point to which each log file has been previously parsed to may be known. For example, in some approaches, a state of the action 740 may be represented by the byte offset of a parsed log upon a rule being loaded that includes action 740. Accordingly, the action 740 will only be evaluated beginning at, e.g., read from, the specified offset.

According to another example, referring again to FIG. 7D, the action 760 may in some approaches be stateful, e.g., see state 770. For example, the action 760 may indicate a location of a database up to which data has previously been read/considered. In some approaches, such a location may be represented by a defined attribute, e.g., a user defined attribute, where each location of a plurality of potential locations of the database may be pre-associated with a unique attribute. Moreover, such attributes may be monotonically increasing in accordance with an extent of the database that has previously been read/considered. Upon loading a rule that includes an action with such a defined attribute, only portions of the database that the attribute indicates have not previously been read/considered may be read/considered as the defined subset of metadata and/or in order to define the subset of metadata.

Referring now to FIG. 7E, the rule 780 is a non-limiting example of a rule that includes a bundle of sub-rules according to one approach. For example, in the current approach, the rule 780 includes a first sub-rule 782. The first sub-rule 782 may be used for defining a subset of metadata associated with common workflow language workflow step information. The subset of metadata defined by the first sub-rule 782 may be collected in accordance with the action and written to a database. Moreover, the rule 780 includes a second sub-rule 784. The second sub-rule 784 may be used for defining a subset of metadata associated with common workflow language workflow information. The subset of metadata defined by the second sub-rule 784 may be collected in accordance with the action and written to the database. The rule 780 also includes a third sub-rule 786 in the current approach. The third sub-rule 786 may be used for defining a subset of metadata associated with a complete workload management solution for a high-performance computing environment. The subset of metadata defined by the third sub-rule 786 may be collected in accordance with the action and written to the database.

In some approaches, each of the sub-rules 782, 784, 786 of the rule 780 may pertain to a different application. For example, at least one of the sub-rules 782, 784, 786 of the rule 780 may pertain to a data processing application. Moreover, according to another example, a different one of the sub-rules 782, 784, 786 of the rule 780 may pertain to a database storage management application. In response to a rule having sub-rules being loaded in response to detecting occurrence of a trigger event, in some approaches, only a portion of the sub-rules that pertain to applications that are active at a time that the trigger event occurs may be applied during the collection of a subset of metadata. For example, only subsets of metadata that are defined by sub-rules associated with the active applications may be collected. It should be noted that metadata collected in accordance with different sub-rules of a rule may be stored to the same or different databases, depending on the approach.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method comprising:
monitoring for occurrence of trigger events corresponding to creation of metadata in a computing environment;
detecting occurrence of a trigger event;
in response to detecting occurrence of the trigger event, loading a rule that is associated with the detected trigger event,
wherein the rule includes a condition and an action,
wherein the action defines a subset of metadata associated with processing a job in the computing environment,
wherein the condition includes a matching condition that calls for a regex to match a file path,
wherein the subset of metadata includes bytes of data written during the processing of the job to a file specified by the rule;
in response to the condition of the rule being met, collecting the defined subset of metadata in accordance with the action; and
storing the collected subset of metadata.

2. The computer-implemented method of claim 1, wherein the action is stateful.

3. The computer-implemented method of claim 2, wherein at least one state of the stateful action is selected from the group of states consisting of: a byte offset of a log file that is parsed during the processing of the job and a byte offset on a metadata file, wherein the action is evaluated from the byte offset on.

4. The computer-implemented method of claim 1, wherein loading the rule includes loading a bundle of sub-rules that are pre-associated with the detected trigger event, wherein the subset(s) of metadata defined by actions of the bundle of sub-rules are collected in accordance with more than one action of the sub-rules of the bundle of sub-rules.

5. The computer-implemented method of claim 1, wherein the defined subset of metadata includes at least one type of data selected from the group consisting of: intermediate data, environment data, and telemetry.

6. The computer-implemented method of claim 1, wherein the trigger events are selected from the group consisting of: a new entry being added to a scheduler, a new log message being appended to a job log associated with the job, a file system being opened, a file system being closed, a renaming of a file, a file system being written to, a file system being read from, a put and/or get function being performed, a migrating of a file of a file system, a migrating of a file in a storage system, an archiving of a file of a file system, and a replicating of data.

7. The computer-implemented method of claim 1, wherein collecting the defined subset of metadata in accordance with the action includes performing an action selected from the group consisting of: indexing structured data, indexing unstructured data, indexing log data, indexing data from a database and loading telemetry.

8. The computer-implemented method of claim 1, comprising indexing the collected subset of metadata.

9. A computer program product, the computer program product comprising a computer readable storage medium having program instructions embodied therewith, the program instructions readable and/or executable by a computer to cause the computer to:
monitor, by the computer, for occurrence of trigger events corresponding to creation of metadata in a computing environment;
detect, by the computer, occurrence of a trigger event;
in response to detecting occurrence of the trigger event, load, by the computer,
a rule that is associated with the detected trigger event,
wherein the rule includes a condition and an action,
wherein the action defines a subset of metadata associated with processing a job in the computing environment,
wherein the condition includes a matching condition that calls for a regex to match a file path,
wherein the subset of metadata includes bytes of data written during the processing of the job to a file specified by the rule;
in response to the condition of the rule being met, collect, by the computer, defined subset of metadata in accordance with the action; and
store, by the computer, the collected subset of metadata.

10. The computer program product of claim 9, wherein collecting the subset of metadata includes performing an action selected from the group consisting of: indexing structured data, indexing unstructured data, indexing log data, indexing data from a database and loading telemetry.

11. The computer program product of claim 9, wherein the action is stateful.

12. The computer program product of claim 11, wherein at least one state of the stateful action is selected from the group of states consisting of: a byte offset of a log file that is parsed during the processing of the job, a byte offset on a metadata file, and a predefined attribute in a database of a system within the computing environment.

13. The computer program product of claim 9, wherein loading the rule includes loading a bundle of sub-rules that are pre-associated with the detected trigger event, wherein the subset(s) of metadata defined by actions of the bundle of sub-rules are collected in accordance with more than one action of the sub-rules of the bundle of sub-rules.

14. The computer program product of claim 9, wherein the defined subset of metadata includes at least one type of data selected from the group consisting of:
intermediate data, environment data, and telemetry.

15. The computer program product of claim 9, wherein the trigger events are selected from the group consisting of: a new entry being added to a scheduler, a new log message being appended to a job log associated with the job, a file system being opened, a file system being closed, a renaming of a file, a file system being written to, a file system being read from, a put and/or get function being performed, a migrating of a file of a file system, a migrating of a file in a storage system, an archiving of a file of a file system, and a replicating of data, wherein the condition includes an arithmetic comparison.

16. The computer program product of claim 9, wherein the trigger event occurs periodically upon a predetermined amount of time elapsing.

17. The computer program product of claim 9, the program instructions readable and/or executable by the computer to cause the computer to: index the collected subset of metadata.

18. A system, comprising:
a processor; and
logic integrated with the processor, executable by the processor, or integrated with and executable by the processor, the logic being configured to:
monitor for occurrence of trigger events corresponding to creation of metadata in a computing environment;

detect occurrence of a trigger event, wherein the trigger event includes a log file being written to;

in response to detecting occurrence of the trigger event, determine a rule that is pre-associated with the detected trigger event;

load the rule for evaluating a condition and an action of the rule, wherein the action defines a subset of metadata associated with processing a job in the computing environment, wherein the condition of the rule specifies whether the subset of metadata is collected;

determine whether the condition of the rule is met, wherein only data of the log file beginning from a most recently stored offset of the log file is read to determine whether the condition of the rule is met;

in response to the condition of the rule being met, collect the defined subset of metadata in accordance with the action;

update, on the log file, the offset to an end position of the read performed to determine whether the condition of the rule is met; and store the collected subset of metadata.

19. The system of claim 18, wherein collecting the defined subset of metadata in accordance with the action includes performing an action selected from the group consisting of: indexing structured data, indexing unstructured data, indexing log data, indexing data from a database and loading telemetry.

20. The computer-implemented method of claim 1, wherein the condition of the rule specifies whether the subset of metadata is collected.

\* \* \* \* \*